(12) United States Patent
Takagi et al.

(10) Patent No.: US 10,097,106 B1
(45) Date of Patent: Oct. 9, 2018

(54) POWER CONVERTER

(71) Applicant: KABUSHIKI KAISHA TOYOTA CHUO KENKYUSHO, Nagakute-shi, Aichi-ken (JP)

(72) Inventors: Kenichi Takagi, Nagakute (JP); Shuntaro Inoue, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 0 days.

(21) Appl. No.: 15/876,600

(22) Filed: Jan. 22, 2018

(30) Foreign Application Priority Data

Apr. 5, 2017 (JP) ................................. 2017-075044

(51) Int. Cl.
*H02M 7/219* (2006.01)
*H02M 1/088* (2006.01)
*H02M 1/42* (2007.01)

(52) U.S. Cl.
CPC ........... *H02M 7/219* (2013.01); *H02M 1/088* (2013.01); *H02M 1/4233* (2013.01)

(58) Field of Classification Search
CPC .... H02M 1/4208; H02M 1/4233; H02M 1/12; H02M 3/325; H02M 3/335; H02M 3/33569; H02M 3/3155; H02M 7/219; H02M 7/537; H02M 7/5387; H02M 7/53871
USPC .... 363/16, 17, 34, 37, 39, 40, 44, 123, 125, 363/131, 132
See application file for complete search history.

(56) References Cited

U.S. PATENT DOCUMENTS

| | | | | |
|---|---|---|---|---|
| 5,157,592 A | * | 10/1992 | Walters | ..................... G05F 1/38 363/132 |
| 7,869,237 B1 | * | 1/2011 | Schutten | ........... H02M 3/33569 363/132 |
| 8,125,205 B2 | * | 2/2012 | Chandrasekaran | . H02M 3/1584 323/282 |
| 9,099,232 B2 | * | 8/2015 | Chandrasekaran | ... H02M 3/155 |
| 9,209,701 B2 | | 12/2015 | Takagi et al. | |
| 9,270,187 B2 | | 2/2016 | Takagi et al. | |
| 9,450,499 B2 | | 9/2016 | Takagi et al. | |
| 2010/0289532 A1 | * | 11/2010 | Wendt | ................... H02M 3/335 327/103 |

(Continued)

FOREIGN PATENT DOCUMENTS

| | | |
|---|---|---|
| JP | 2010-183726 A | 8/2010 |
| JP | 2011-193713 A | 9/2011 |
| JP | 2012-125040 A | 6/2012 |

*Primary Examiner* — Adolf Berhane
(74) *Attorney, Agent, or Firm* — Oliff PLC

(57) ABSTRACT

A power converter includes first and second switching circuits 12 and 16, a primary winding T1 having both ends connected to the first switching circuit 12, a secondary winding T2 having both ends connected to the second switching circuit 16 and magnetically coupled with the secondary winding T2, and a reactor L having a first end connected to a center tap m of the primary winding T1. The first switching circuit 12 includes a full bridge having half bridges U and V connected in parallel, and diodes D1 and D2 each having one end connected to a common point. The diodes D1 and D2 each have the other end connected to one of two parallel connecting points of the full bridge. Input alternating-current voltage Vin is applied between a second end of the reactor L and the connecting point of the diodes D1 and D2.

6 Claims, 15 Drawing Sheets

(56) References Cited

U.S. PATENT DOCUMENTS

| | | | |
|---|---|---|---|
| 2011/0198933 A1 | 8/2011 | Ishigaki et al. | |
| 2012/0300502 A1* | 11/2012 | Shimada | H02M 1/4258 |
| | | | 363/17 |
| 2016/0149503 A1* | 5/2016 | Usami | H02M 3/33561 |
| | | | 363/17 |
| 2016/0181944 A1* | 6/2016 | James | B60L 11/1816 |
| | | | 363/17 |
| 2017/0005565 A1* | 1/2017 | Bai | H02M 3/33507 |
| 2017/0093299 A1* | 3/2017 | Norimatsu | H02M 5/458 |
| 2017/0310229 A1* | 10/2017 | Fujisaki | H02M 3/33576 |
| 2018/0054126 A1* | 2/2018 | Lu | H02M 1/14 |
| 2018/0152095 A1* | 5/2018 | Bai | H02M 3/33507 |

\* cited by examiner

POWER CONVERTER

CROSS REFERENCE TO RELATED APPLICATION

The disclosure of Japanese Patent Application No. 2017-075044 filed on Apr. 5, 2017 including the specification, claims, drawings, and abstract is incorporated herein by reference in its entirety.

TECHNICAL FIELD

The present disclosure relates to a power converter, and more particularly to an apparatus including two switching circuits for transmitting electric power through two magnetically-coupled windings.

BACKGROUND

Electric-drive vehicles including hybrid vehicles and electric vehicles, for example, are widely used. An electric-drive vehicle includes a battery for supplying electric power to a drive motor. A battery in a hybrid vehicle is charged with electric power generated by driving force of the engine and by regenerative braking. A battery in a plug-in electric drive vehicle is charged with electric power supplied from a commercial power source. In order to charge the battery, the electric-drive vehicle includes a power converter. The power converter converts voltage that is input for charging the battery appropriately and then applies the appropriate voltage to the battery.

JP 2011-193713 A discloses a power converter including two switching circuits magnetically coupled with each other by windings connected to the respective switching circuits for transmitting electric power between the two switching circuits. JP 2010-183726 A discloses a power converter which controls output voltage by adjusting the frequencies of first and second boost converters while improving the power factor of the first and second boost converters based on time ratio modulation.

CITATION LIST

Patent Literature

PATENT DOCUMENT 1: JP 2011-193713 A
PATENT DOCUMENT 2: JP 2010-183726 A

SUMMARY

Technical Problem

JP 2010-183726 A discloses that alternating-current voltage is rectified and converted into direct-current voltage, which is then input to a switching circuit, such as a converter. Such a structure often employs a diode bridge 110 as illustrated in FIG. 15. The diode bridge 110 includes a first diode 101, a second diode 102, a third diode 103, and a fourth diode 104. An anode of the first diode 101 is coupled with a cathode of the second diode 102, and an anode of the third diode 103 is coupled with a cathode of the fourth diode 104 in the diode bridge 110. An alternating-current voltage source 100 is coupled between a connecting point of the first diode 101 and the second diode 102 and a connecting point of the third diode 103 and the fourth diode 104. A smoothing capacitor 105 and a switching circuit 106 are connected between a connecting point of the first diode 101 and the third diode 103 and a connecting point of the second diode 102 and the fourth diode 104. Alternating-current voltage output from the alternating-current voltage source 100 undergoes full-wave rectification by the diode bridge 110, and the resulting voltage is applied across terminals of the smoothing capacitor 105. Then, the voltage across the smoothing capacitor 105 is output, as direct-current voltage, to the switching circuit 106. The smoothing capacitor 105 reduces ripple components contained in the output voltage.

The structure employing such a diode bridge may have significant power loss caused by forward resistance of each of two diodes through which the rectified current flows.

It is an object of the present disclosure to reduce the power loss of a power converter.

Solution to Problem

In accordance with an aspect of the present disclosure, a power converter includes a first switching circuit, a second switching circuit, a primary winding having both ends connected to the first switching circuit, a secondary winding having both ends connected to the second switching circuit and magnetically coupled to the primary winding, and a reactor having a first end connected to an intermediate connecting point of the primary winding. The first switching circuit includes a full bridge having a first half bridge and a second half bridge connected in parallel and a first rectifying element and a second rectifying element. The first half bridge and the second half bridge each include two switching elements. One end of one switching element and one end of the other switching element are connected to a common point. One end of the first rectifying element and one end of the second rectifying element are connected to a common point. The primary winding is connected between a connecting point of the two switching elements of the first half bridge and a connecting point of the two switching elements of the second half bridge. The first rectifying element includes the other end connected to one of two parallel connecting points of the full bridge. The second rectifying element includes the other end connected to the other one of the two parallel connecting points. Alternating-current voltage is input between a second terminal of the reactor and a connecting point of the first rectifying element and the second rectifying element.

In preferred embodiments, the second switching circuit includes an output full bridge having a first output half bridge and a second output half bridge connected in parallel. The first output half bridge and the second output half bridge each include two switching elements, and one end of one switching element and one end of the other switching element are connected to a common point. The secondary winding is connected between a connecting point of the two switching elements of the first output half bridge and a connecting point of the two switching elements of the second output half bridge. Electric power is output from two parallel connecting points of the output full bridge.

In preferred embodiments, the power converter further includes a capacitor connected to the two parallel connecting points of the full bridge, and a controller configured to switch the full bridge and the output full bridge at a time ratio in accordance with a difference between voltage across terminals of the capacitor and a target value of the voltage across the terminals of the capacitor.

In preferred embodiments, the power converter further includes an output capacitor connected to the two parallel connecting points of the output full bridge, and a controller configured to switch the full bridge and the output full bridge. The controller is configured to control a difference between a phase for switching the full bridge and a phase for switching the output full bridge in accordance with a difference between voltage across terminals of the output capacitor and a target value of the voltage across the terminals of the output capacitor.

In preferred embodiments, the power converter further includes a capacitor connected to the two parallel connecting points of the full bridge, and the controller is configured to switch the full bridge and the output full bridge at a time ratio in accordance with a difference between voltage across terminals of the capacitor and a target value of the voltage across the terminals of the capacitor.

In preferred embodiments, each of the first rectifying element and the second rectifying element is a switching element configured to be turned on an off in accordance with a value of the alternating-current voltage.

Advantageous Effects of Invention

The present disclosure reduces power loss of the power converter.

BRIEF DESCRIPTION OF DRAWINGS

Embodiments of the present disclosure will be described by reference to the following figures, wherein.

DESCRIPTION OF EMBODIMENTS

Figure 1:
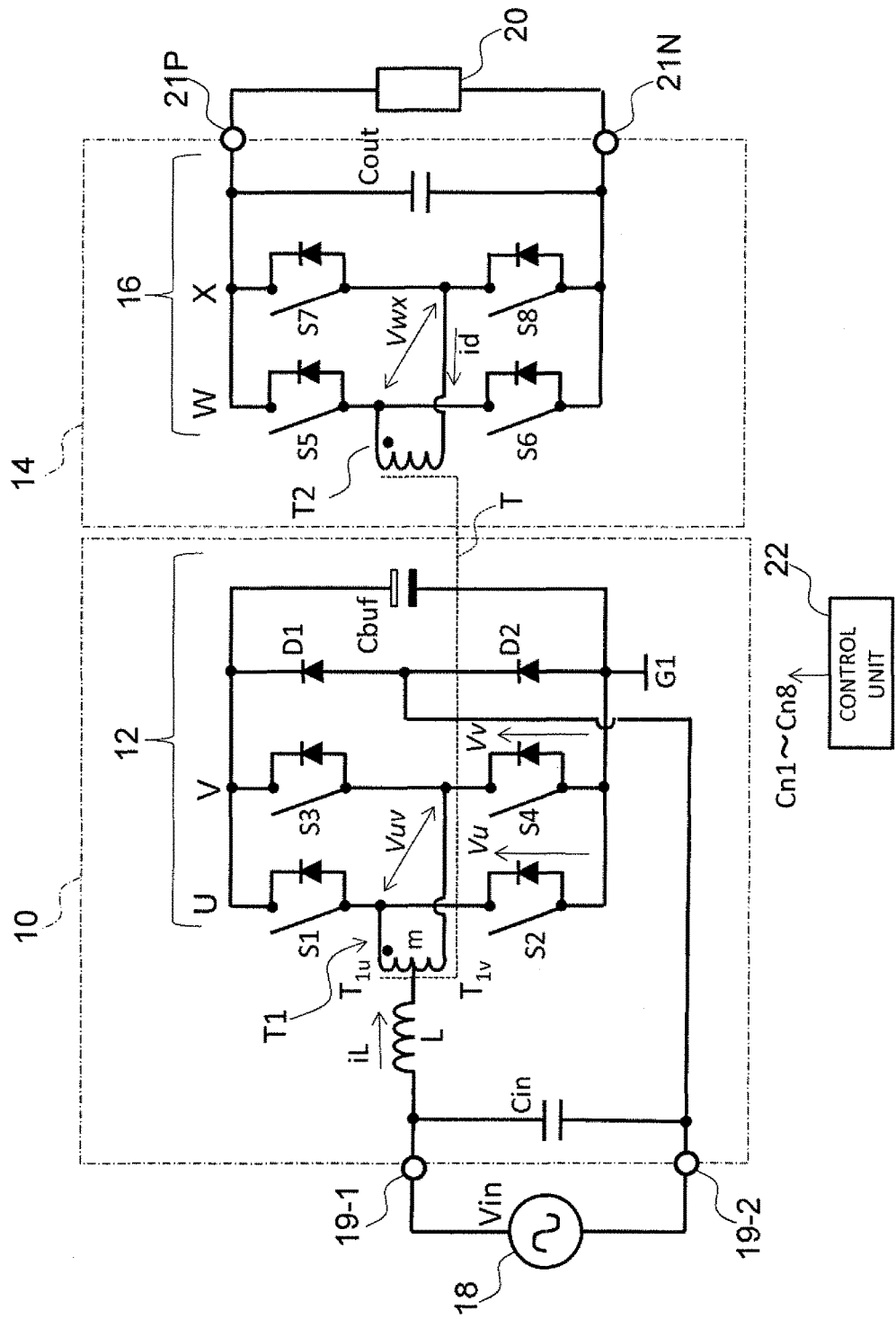
FIG. 1 is a diagram illustrating a structure of an on-vehicle power converter.

FIG. 1 illustrates a structure of an on-vehicle power converter according to an embodiment of the present disclosure. The power converter includes a power-factor improvement circuit 10, a voltage converter circuit 14, and a control unit 22. An alternating-current voltage source 18 is connected to the power-factor improvement circuit 10. The alternating-current voltage source 18 is a commercial power source, for example. When the power converter is installed in a plug-in vehicle, an AC outlet functions as the alternating-current voltage source 18. A load circuit 20 is connected to the voltage converter circuit 14. The load circuit 20 is a charging circuit for charging an on-vehicle battery, for example. The control unit 22 performs on-off control of switching elements of the power-factor improvement circuit 10 and the voltage converter circuit 14, respectively.

The power-factor improvement circuit 10 adjusts the time waveform of the electric current from the alternating-current voltage source 18 through switching to thereby improve the power factor of the power converter with reference to the alternating-current voltage source 18. The power-factor improvement circuit 10 and the voltage converter circuit 14 are coupled by a transformer T, and electric power output from the alternating-current voltage source 18 is transmitted from the power-factor improvement circuit 10 to the voltage converter circuit 14. The voltage converter circuit 14 converts the alternating-current voltage obtained from a secondary winding T2 of the transformer T to direct-current voltage, and outputs direct-current voltage having an appropriate magnitude to the load circuit 20. A combination of the power-factor improvement circuit 10 and the voltage converter circuit 14 efficiently supplies electric power from the alternating-current voltage source 18 to the load circuit 20.

The structure of the power-factor improvement circuit 10 will be described. The power-factor improvement circuit 10 includes a filter capacitor Cin, a reactor L, a primary winding T1, and a first switching circuit 12.

The first switching circuit 12 includes a half bridge U composed of switching elements S1 and S2, a half bridge V composed of switching elements S3 and S4, a diode D1, a diode D2, and a buffer capacitor Cbuf. One end of the switching element S1 and one end of the switching element S2 are connected to form the half bridge U. A parasitic diode, having an anode located closer to a connecting point of the switching element S1 and the switching element S2, is connected to both ends of the switching element S1. A parasitic diode, having a cathode located closer to the connecting point of the switching element S1 and the switching element S2, is connected to both ends of the switching element S2. The switching elements S1 and S2 may be IGBTs (Insulated Gate Bipolar Transistors), for example. In this case, an emitter of the IGBT functioning as the switching element S1 and a collector of the IGBT functioning as the switching element S2 are connected. In general, an IGBT includes a parasitic diode.

Similarly, one end of the switching element S3 and one end of the switching element S4 are connected to form the half bridge V. A parasitic diode, having an anode located closer to a connecting point of the switching element S3 and the switching element S4, is connected to both ends of the switching element S3. A parasitic diode, having a cathode located closer to the connecting point of the switching element S3 and the switching element S4, is connected to both ends of the switching element S4. The switching elements S3 and S4 may be IGBTs (Insulated Gate Bipolar Transistors), for example. In this case, an emitter of the IGBT functioning as the switching element S3 and a collector of the IGBT functioning as the switching element S4 are connected.

The primary winding T1 is connected between the connecting point of the switching elements S1 and S2 and the connecting point of the switching elements S3 and S4. A first end of the reactor L is connected to a center tap m (intermediate connecting point) of the primary winding T1. A second end of the reactor L is connected to a power source input terminal 19-1.

The half bridges U and V are connected in parallel with each other to form a full bridge. More specifically, a terminal of the switching element S1 farther from the switching element S2 (a terminal on the upper side of the drawing; hereinafter referred to as an "upper terminal") and a terminal of the switching element S3 farther from the switching element S4 (a terminal on the upper side of the drawing; hereinafter referred to as an "upper terminal") are connected. Further, a terminal of the switching element S2 farther from the switching element S1 (a terminal on the lower side of the drawing; hereinafter referred to as a "lower terminal") and a terminal of the switching element S4 farther from the switching element S3 (a terminal on the lower side of the drawing; hereinafter referred to as a "lower terminal") are connected.

An anode of the diode D1 is connected to a cathode of the diode D2. A cathode of the diode D1 is connected to the upper terminals of the switching elements S1 and S3 of the half bridges U and V, respectively, and an anode of the diode D2 is connected to the lower terminals of the switching elements S2 and S4 of the half bridges U and V, respectively. A connecting point of the diode D1 and the diode D2 is connected to a power source input terminal 19-2.

The buffer capacitor Cbuf is connected between a connecting point of the switching element S1, the switching element S3, and the diode D1, and a connecting point of the switching element S2, the switching element S4, and the diode D2.

The primary winding T1 is magnetically coupled to the secondary winding T2 of the voltage converter circuit 14. The primary winding T1 and the secondary winding T2 form the transformer T.

The filter capacitor Cin is connected between the power source input terminal 19-1 and the power source input terminal 19-2. The alternating-current voltage source 18 is further connected between the power source input terminal 19-1 and the power source input terminal 19-2. When the alternating-current voltage source 18 is a commercial power source, a power source plug is connected, via a cable, to the power source input terminals 19-1 and 19-2. The power source plug is then plugged into the AC outlet.

The operation of the power-factor improvement circuit 10 will be summarized. The alternating-current voltage source 18 outputs input alternating-current voltage Vin, which is a sinusoidal voltage, to the power source input terminals 19-1 and 19-2. The filter capacitor Cin reduces high frequency current generated by the power-factor improvement circuit 10 and flowing toward the alternating-current voltage source 18.

The control unit 22 outputs control signals Cn1 to Cn4 to the respective switching elements S1 to S4, to control the switching elements S1 to S4 on or off. When the control signal Cni is high, the corresponding switching element S1 is turned on; when the control signal Cni is low, the corresponding switching element S1 is turned off. Here, i is any of integer numbers 1 to 4. The control signal Cn2 has a high or low state which is inverted with respect to the control signal Cn1; the control signal Cn4 has a high or low state which is inverted with respect to the control signal Cn3. The phases of the control signals Cn3 and Cn4 are delayed by 180° from those of the control signals Cn1 and Cn2, respectively.

This structure turns the switching element S1 and the switching element S2 on and off alternately. Specifically, when the switching element S1 shifts from the off state to the on state, the switching element S2 shifts from the on state to the off state; when the switching element S1 shifts from the on state to the off state, the switching element S2 shifts from the off state to the on state. Similarly, the switching element S3 and the switching element S4 turn on and off alternately. The on and off phases of the switching elements S3 and S4 are delayed by 180° from those of the switching element S1 and S2.

The control unit 22 changes the time ratios (duty ratios) of the control signals Cn1 to Cn4 in accordance with a difference between the voltage across the terminal of the buffer capacitor Cbuf and its target value, current iL flowing in the reactor L, and the input alternating-current voltage Vin output by the alternating-current voltage source 18. This structure of the control unit 22 makes the time waveform of the current flowing through the power source input terminals 19-1 and 19-2 similar to or identical with the time waveform of the input alternating-current voltage Vin, and makes the phase of the current flowing in the power source input terminals 19-1 and 19-2 similar to or identical with the phase of the input alternating-current voltage Vin. The time ratio in the power-factor improvement circuit 10 is defined as a ratio of the time during which the control signal Cn2 is turned on with respect to the cycle of the control signal Cn2.

The cycles of the control signals Cn1 to Cn4 are sufficiently shorter than the cycle of the input alternating-current voltage Vin. The time waveform of the current flowing in the reactor L and the primary winding T1 is shaped by switching of the switching elements S1 to S4. Power factor improving operations are thus executed.

Figure 2:
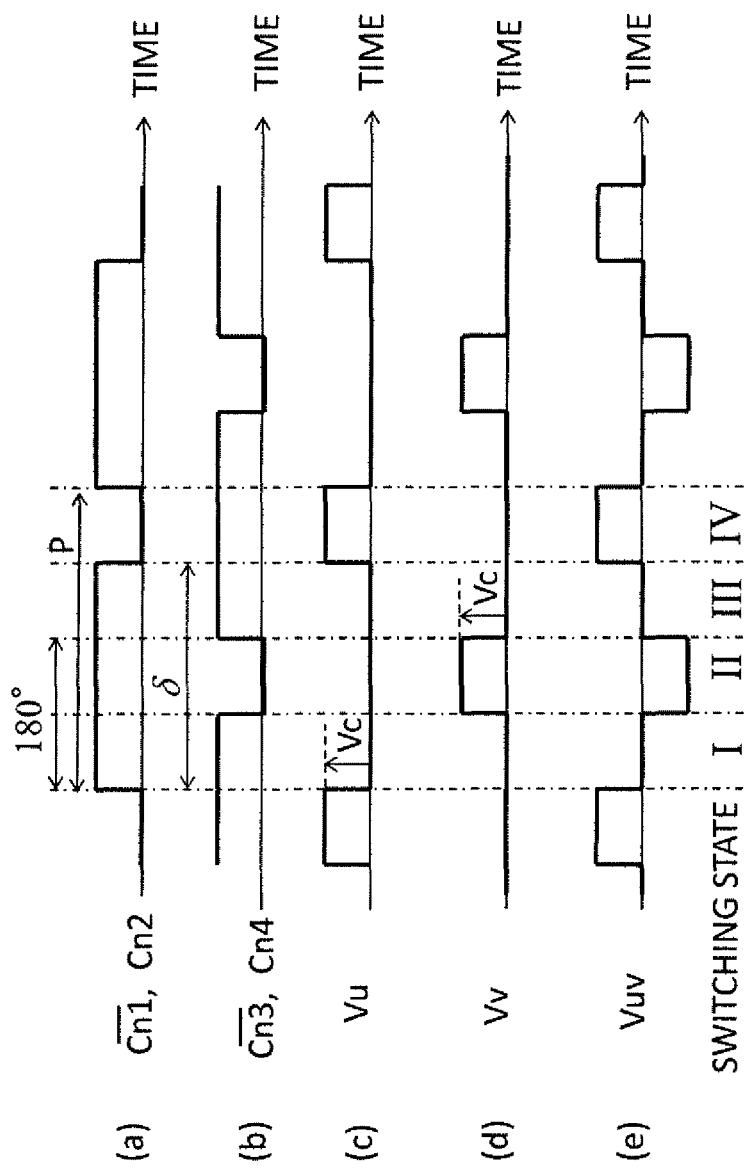
FIG. 2 is a diagram showing operation timing of a power-factor improvement circuit during a half cycle in which input alternating-current voltage has positive values.

FIG. 2 shows operation timing of the power-factor improvement circuit 10 during a half cycle in which the input alternating-current voltage Vin has positive values. Specifically, a chart (a) shows the time waveform of an inverted value of the control signal Cn1 and the control signal Cn2, and a chart (b) shows the time waveform of an inverted value of the control signal Cn3 and the control signal Cn4. The symbol "-" above a reference numeral denotes an inverted value of the control signal denoted by the reference numeral. A chart (c) shows the time waveform of potential Vu (U-phase potential Vu) at the connecting point of the switching elements S1 and S2, and a chart (d) shows the time waveform of potential Vv (V-phase potential Vv) at the connecting point of the switching elements S3 and S4. A chart (e) shows the time waveform of voltage Vuv (primary winding voltage Vuv) to be applied to the primary winding T1. The inverted value of the control signal Cn1 and the inverted value of the control signal Cn3 are the same as the control signal Cn2 and the control signal Cn4, respectively. The reference of the U-phase potential Vu and the V-phases potential Vv is potential of ground conductor G1.

As shown in the chart (a) in FIG. 2, the cycle of the inverted value of the control signal Cn1 and the control signal Cn2 is P; during one cycle P, the inverted value of the control signal Cn1 and the control signal Cn2 turn high for a period of high time $\delta$. As shown in the chart (b) in FIG. 2, the inverted value of the control signal Cn3 and the control signal Cn4 are delayed by a half cycle; that is, 180°, with respect to the inverted value of the control signal Cn1 and the control signal Cn2. The time ratio $\alpha$ is $\alpha = \delta/P$; the high time $\delta$ changes with the instantaneous value of the input alternating-current voltage Vin, and the time ratio $\alpha$ changes in accordance with the change of the high time $\delta$.

The operation of the power-factor improvement circuit 10 will now be described based on the assumption that the buffer capacitor Cbuf is charged to a fixed voltage Vc. The operation for charging the buffer capacitor Cbuf will be described further below.

When the control signal Cn1 is high and the control signal Cn2 is low, the switching element S1 is turned on and the switching element S2 is turned off. This makes the U-phase potential Vu functioning as the charging voltage Vc of the buffer capacitor Cbuf. When the control signal Cn1 is low and the control signal Cn2 is high, the switching element S1 is turned off and the switching element S2 is turned on. This causes the U-phase potential to become zero. Therefore, as shown in the chart (c) in FIG. 2, the U-phase potential Vu becomes Vc for a time (P−δ) in the cycle P and becomes zero during other times.

When the control signal Cn3 is high and the control signal Cn4 is low, the switching element S3 is turned on and the switching element S4 is turned off. This makes the V-phase potential Vv functioning as the charging voltage Vc of the buffer capacitor Cbuf. When the control signal Cn3 is low and the control signal Cn4 is high, the switching element S3 is turned off and the switching element S4 is turned on. This makes the V-phase potential zero. Therefore, as shown in the chart (d) in FIG. 2, the V-phase potential Vv has the same time waveform as that of the U-phase potential Vu, and the phase of the V-phase potential Vv is delayed by 180° from the phase of the U-phase potential Vu.

The primary winding voltage Vuv is determined by subtracting the V-phase potential Vv from the U-phase potential Vu. Consequently, the time waveform of the primary winding voltage Vuv has a peak value Vc and is symmetrical with respect to the positive-negative direction as shown in chart (e) in FIG. 2.

Figure 3:
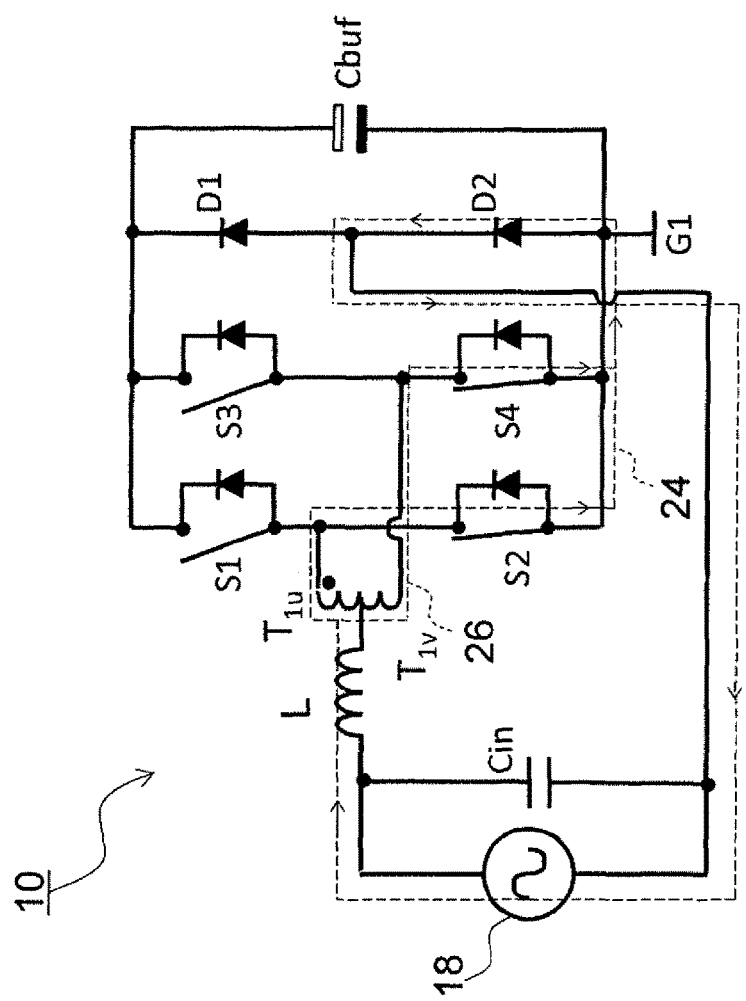
FIG. 3 is a diagram showing electric current flowing in switching states I and III.
Figure 4:
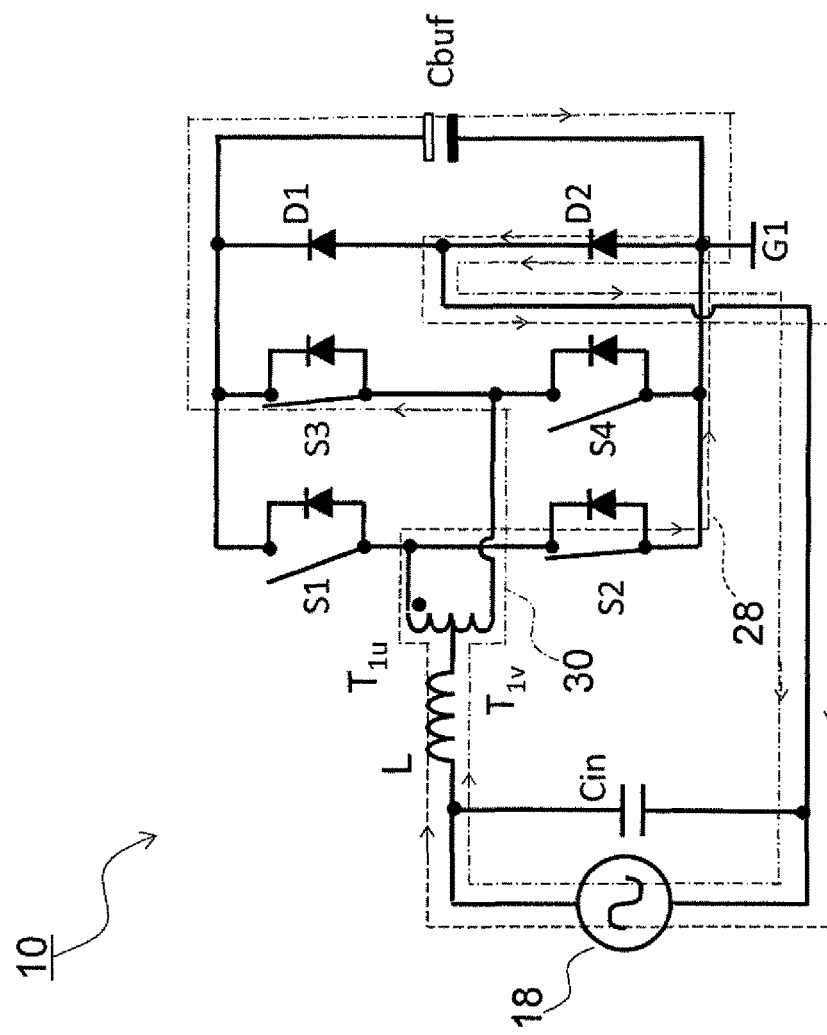
FIG. 4 is a diagram showing electric current flowing in a switching state II.
Figure 5:
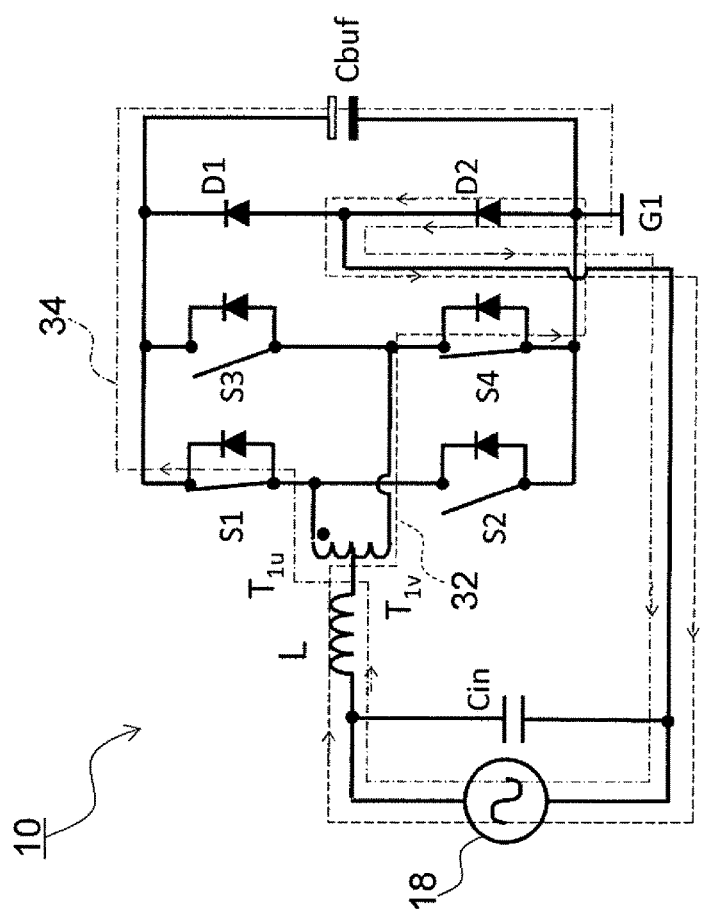
FIG. 5 is a diagram showing electric current flowing in a switching state IV.

During the half cycle in which the input alternating-current voltage Vin has positive values, the power-factor improvement circuit 10 has four states: switching states I to IV. In the switching states I and III, the switching elements S1 and S3 are turned off and the switching elements S2 and S4 are turned on. FIG. 3 shows flow of the current in the switching states I and III. FIG. 3, however, shows only the power-factor improvement circuit 10 in the power converter. FIGS. 4 and 5 described below similarly show only the power-factor improvement circuit 10. Current 24 flows, from the alternating-current voltage source 18, through the reactor L, a U-phase portion winding $T_{1u}$, closer to the U-phase side with respect to the center tap m, the switching element S2, and the second diode D2, and flows back to the alternating-current voltage source 18. Current 26 flows, from the alternating-current voltage source 18, through the reactor L, a V-phase portion winding $T_{1v}$, closer to the V-phase side with respect to the center tap m, the switching element S4, and the second diode D2, and flows back to the alternating-current voltage source 18. The current 24 and the current 26 do not contribute to charging of the buffer capacitor Cbuf.

In the switching state II, the switching elements S1 and S4 are turned off and the switching elements S2 and S3 are turned on. FIG. 4 shows the flow of current in the switching state II. Current 28 flows through the same path as that of the current 24 shown in FIG. 3. Current 30 flows, from the alternating-current voltage source 18, through the reactor L, the V-phase portion winding $T_{1v}$, the switching element S3, the buffer capacitor Cbuf, and the second diode D2, and flows back to the alternating-current voltage source 18. The buffer capacitor Cbuf is charged with the current 30.

In the switching state IV, the switching elements S1 and S4 are turned on and the switching elements S2 and S3 are turned off. FIG. 5 shows the flow of current in the switching state IV. Current 32 flows through the same path as that of the current 26 as shown in FIG. 3. Current 34 flows, from the alternating-current voltage source 18, through the reactor L, the U-phase portion winding $T_{1u}$, the switching element S1, the buffer capacitor Cbuf, and the second diode D2, and flows back to the alternating-current voltage source 18. The buffer capacitor Cbuf is charged with the current 34.

As described above, the buffer capacitor Cbuf is charged with the current 30 in the switching state II and the current 34 in the switching state IV.

Figure 6:
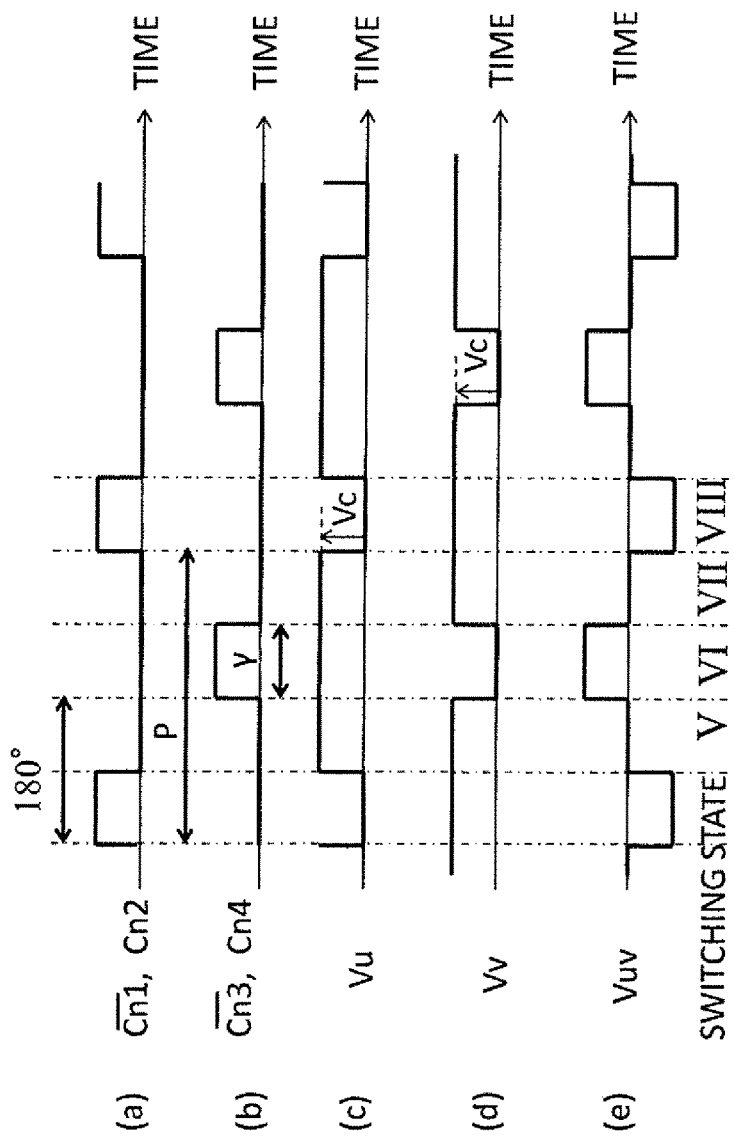
FIG. 6 is a diagram showing operation timing of the power-factor improvement circuit during a half cycle in which the input alternating-current voltage has negative values.

FIG. 6 shows operation timing of the power-factor improvement circuit 10 during a half cycle in which the input alternating-current voltage Vin has negative values. Specifically, a chart (a) shows the time waveform of an inverted value of the control signal Cn1 and the control signal Cn2, a chart (b) shows the time waveform of an inverted value of the control signal Cn3 and the control signal Cn4, a chart (c) shows the time waveform of the U-phase potential Vu, a chart (d) shows the time waveform of the V-phase potential Vv, and a chart (e) shows the time waveform of the primary winding voltage Vuv. Elements that are the same as those in FIG. 2 are denoted with the same reference numerals and will not be described again.

As shown in the chart (a) in FIG. 6, the cycle of the inverted value of the control signal Cn1 and the control signal Cn2 is P; during one cycle P, the inverted value of the control signal Cn1 and the control signal Cn2 turn high for a period of high time γ. As shown in the chart (b) in FIG. 6, the inverted value of the control signal Cn3 and the control signal Cn4 are delayed by a half cycle; that is, 180°, with respect to the inverted value of the control signal Cn1 and the control signal Cn2. The time ratio α is α=γ/P; the high time γ changes with the instantaneous value of the input alternating-current voltage Vin, and the time ratio α changes in accordance with the change of the high time γ.

Based on the similar operation in the half cycle in which the input alternating-current voltage Vin has positive values, in the half cycle in which the input alternating-current voltage Vin has negative values, the U-phase potential Vu becomes Vc for a time (P−γ) in the cycle P and becomes zero during other time, as shown in the chart (c) in FIG. 6. Further, as shown in chart (d) in FIG. 6, the V-phase potential Vv has the same time waveform as that of the U-phase potential Vu, and the phase of the V-phase potential Vv is delayed by 180° from the phase of the U-phase potential Vu. The primary winding voltage Vuv is determined by subtracting the V-phase potential Vv from the U-phase potential Vu. Consequently, the time waveform of the primary winding voltage Vuv has a peak value Vc and is symmetrical with respect to the positive-negative direction as shown in the chart (e) in FIG. 6.

Figure 7:
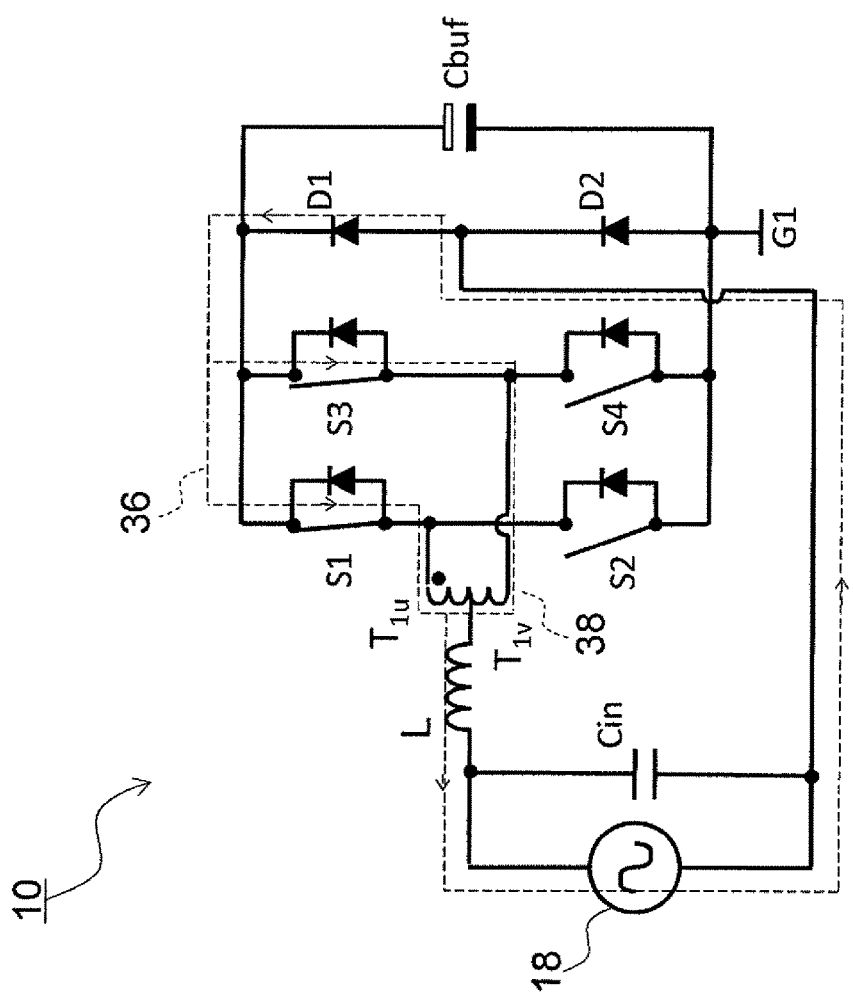
FIG. 7 is a diagram showing electric current flowing in switching states V and VII.
Figure 8:
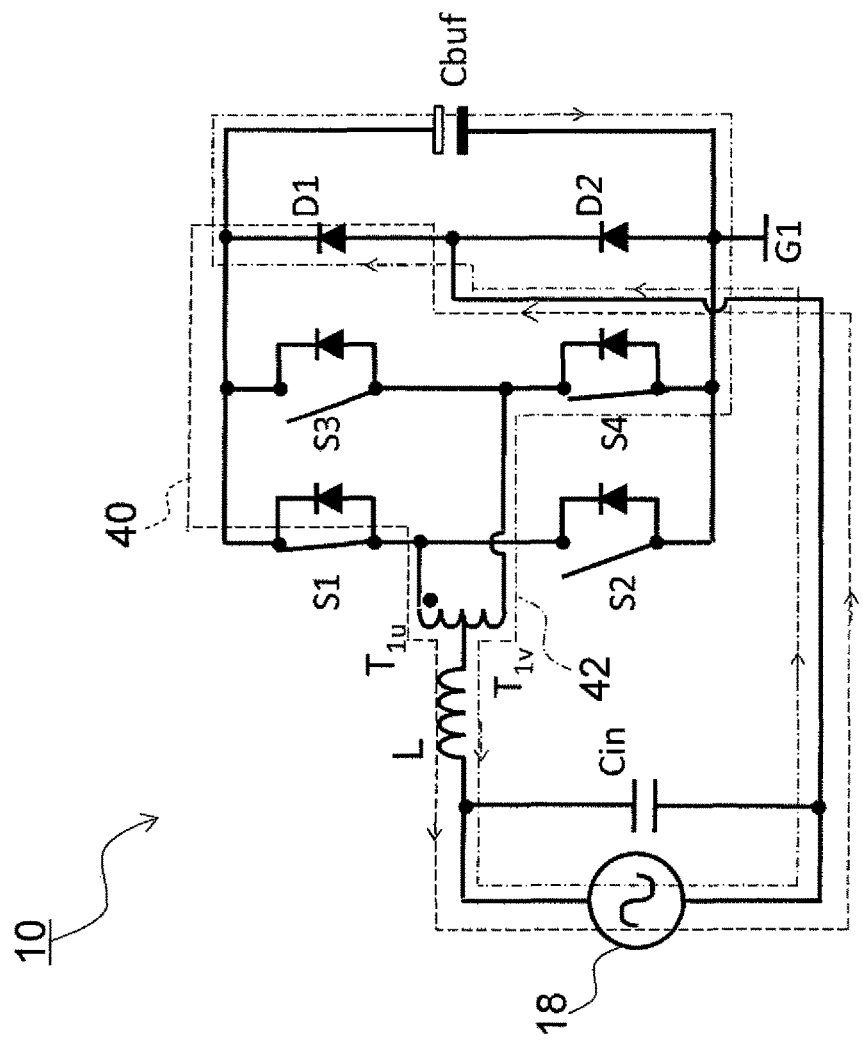
FIG. 8 is a diagram showing electric current flowing in a switching state VI.
Figure 9:
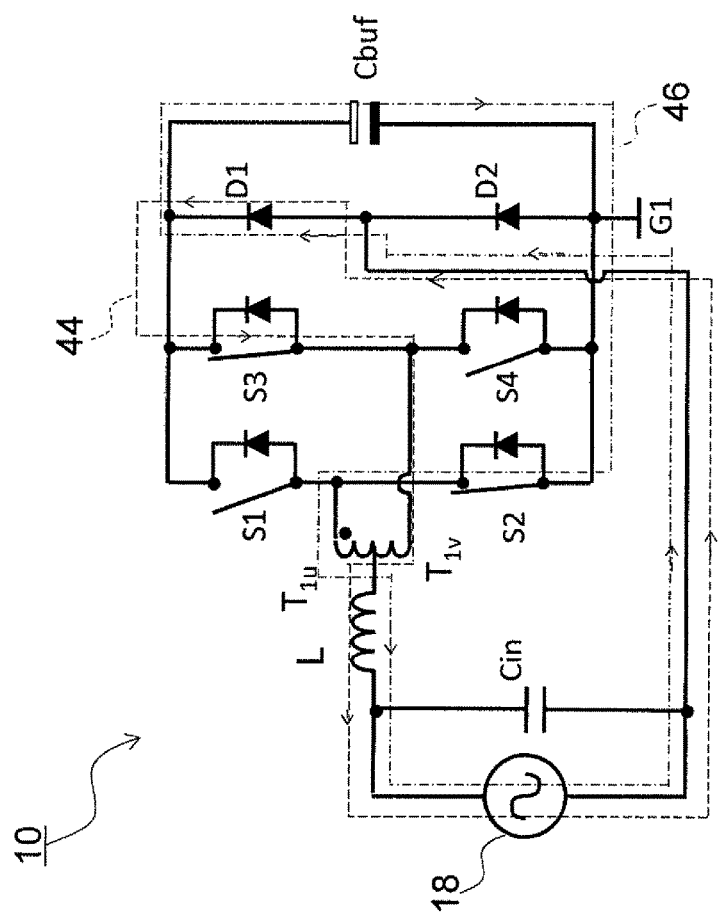
FIG. 9 is a diagram showing electric current flowing in a switching state VIII.

During the half cycle in which the input alternating-current voltage Vin has negative values, the power-factor improvement circuit 10 has four states: switching states V to VIII. In the switching states V and VII, the switching elements S1 and S3 are turned on and the switching elements S2 and S4 are turned off. FIG. 7 shows flow of the current in the switching states V and VII. FIG. 7, however, shows only the power-factor improvement circuit 10 in the power converter. FIGS. 8 and 9 described below similarly show only the power-factor improvement circuit 10.

Current 36 flows, from the alternating-current voltage source 18, through the diode D1, the switching element S1, the U-phase portion winding $T_{1u}$, and the reactor L, and flows back to the alternating-current voltage source 18. Current 38 flows, from the alternating-current voltage source 18, through the diode D1, the switching element S3, the V-phase portion winding $T_{1v}$, and the reactor L, and flows back to the alternating-current voltage source 18. The current 36 and the current 38 do not contribute to charging of the buffer capacitor Cbuf.

In the switching state VI, the switching elements S1 and S4 are turned on and the switching elements S2 and S3 are turned off. FIG. 8 shows the flow of current in the switching state VI. Current 40 flows through the same path as that of the current 36 shown in FIG. 7. Current 42 flows, from the alternating-current voltage source 18, through the diode D1, the buffer capacitor Cbuf, the switching element S4, the V-phase portion winding $T_{1v}$, and the reactor L, and flows back to the alternating-current voltage source 18. The buffer capacitor Cbuf is charged with the current 42.

In the switching state VIII, the switching elements S1 and S4 are turned off and the switching elements S2 and S3 are turned on. FIG. 9 shows the flow of current in the switching state VIII. Current 44 flows through the same path as that of the current 38 shown in FIG. 7. Current 46 flows, from the alternating-current voltage source 18, through the diode D1, the buffer capacitor Cbuf, the switching element S2, the U-phase portion winding $T_{1u}$, and the reactor L, and flows back to the alternating-current voltage source 18. The buffer capacitor Cbuf is charged with the current 46.

As described above, the buffer capacitor Cbuf is charged with the current 42 in the switching state VI and the current 46 in the switching state VIII.

Figure 15:
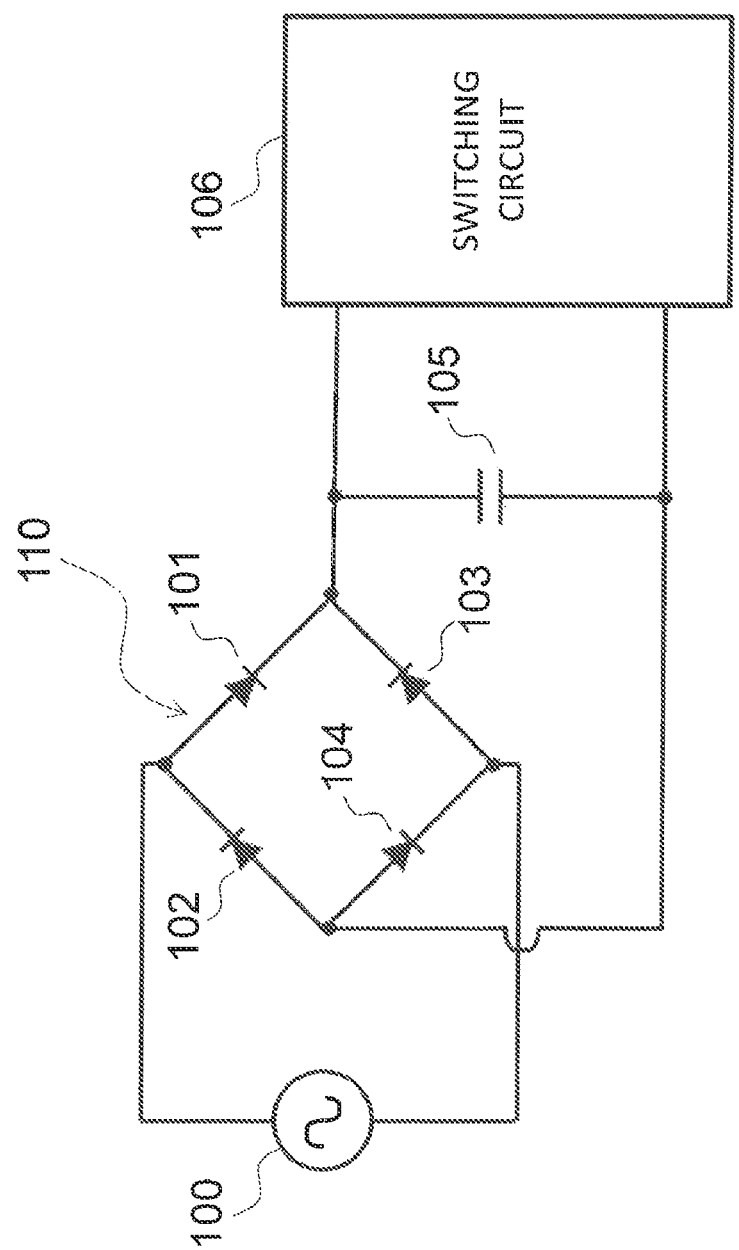
FIG. 15 is a diagram of an example rectifier circuit including a diode bridge.

The power-factor improvement circuit 10 operates as described above to adjust the time waveform of the current flowing from the alternating-current voltage source 18 and improve the power factor of the power converter with reference to the alternating-current voltage source 18. The power-factor improvement circuit 10 operates to further charge the buffer capacitor Cbuf and also apply the primary winding voltage Vuv having a time waveform which is symmetrical with respect to the positive-negative direction to the primary winding T1. During this operation, the charging voltage to the buffer capacitor Cbuf stabilizes the peak value of the primary winding voltage Vuv. The primary winding voltage Vuv, having a time waveform which is symmetrical with respect to the positive-negative direction, enables highly efficient transmission of electric power from the primary winding T1 to the secondary winding T2. Further, as each current path includes a single diode, the loss in the diode is reduced in the power converter when compared to the structure including a diode bridge as illustrated in FIG. 15.

Referring back to FIG. 1, the structure of the voltage converter circuit 14 will be described. The voltage converter circuit 14 includes the secondary winding T2 and the second switching circuit 16.

The second switching circuit 16 includes an output half bridge W composed of switching elements S5 and S6, an output half bridge X composed of switching elements S7 and S8, and an output capacitor Cout. One end of the switching element S5 and one end of the switching element S6 are connected to form the output half bridge W. A parasitic diode, having an anode located closer to a connecting point of the switching element S5 and the switching element S6, is connected to both ends of the switching element S5. A parasitic diode, having a cathode located closer to a connecting point of the switching element S5 and the switching element S6, is connected to both ends of the switching element S6. The switching elements S5 and S6 may be IGBTs (Insulated Gate Bipolar Transistors), for example. In this case, an emitter of the IGBT functioning as the switching element S5 and a collector of the IGBT functioning as the switching element S6 are connected.

Similarly, one end of the switching element S7 and one end of the switching element S8 are connected to form the output half bridge X. A parasitic diode, having an anode located closer to a connecting point of the switching element S7 and the switching element S8, is connected to both ends of the switching element S7. A parasitic diode, having a cathode located closer to a connecting point of the switching element S7 and the switching element S8, is connected to both ends of the switching element S8. The switching elements S7 and S8 may be IGBTs (Insulated Gate Bipolar Transistors), for example. In this case, an emitter of the IGBT functioning as the switching element S7 and a collector of the IGBT functioning as the switching element S8 are connected.

The secondary winding T2 is connected between the connecting point of the switching elements S5 and S6 and the connecting point of the switching elements S7 and S8.

The output half bridges W and X are connected in parallel with each other to form an output full bridge. More specifically, an upper terminal of the switching element S5 and an upper terminal of the switching element S6 are connected. Further, a lower terminal of the switching element S7 and a lower terminal of the switching element S8 are connected. The output capacitor Cout is connected between the upper terminals of the switching elements S5 and S7 of the output half bridges W and X and the lower terminals of the switching elements S6 and S8 of the output half bridges W and X. A positive electrode load terminal 21P is connected to the upper terminals of the switching elements S5 and S7 of the output half bridges W and X, respectively, and a negative electrode load terminal 21N is connected to the lower terminals of the switching elements S6 and S8 of the output half bridges W and X, respectively. Further, the load circuit 20 is connected between the positive electrode load terminal 21P and the negative electrode load terminal 21N.

The operation of the voltage converter circuit 14 will be summarized. In accordance with the voltage applied to the primary winding T1 of the power-factor improvement circuit 10, voltage is generated at the secondary winding T2. The voltage generated at the secondary winding T2 is applied to the connecting point of the switching elements S5 and S6 and to the connecting point of the switching elements S7 and S8.

The control unit 22 outputs control signals Cn5 to Cn8 to the respective switching elements S5 to S8, to control the switching elements S5 to S8 on or off. When the control signal Cni is high, the corresponding switching element S1 is turned on; when the control signal Cni is low, the corresponding switching element S1 is turned off. Here, i is any of integer numbers 5 to 8. The control signal Cn6 has a high or low state which is inverted with respect to the control signal Cn5; the control signal Cn8 has a high or low state which is inverted with respect to the control signal Cn7. The phases of the control signals Cn7 and Cn8 are delayed by 180° from the phases of the control signals Cn5 and Cn6, respectively.

This structure turns the switching element S5 and the switching element S6 alternately on and off. Specifically, when the switching element S5 shifts from the off state to the on state, the switching element S6 shifts from the on state to the off state; when the switching element S5 shifts from the on state to the off state, the switching element S6 shifts from the off state to the on state. Similarly, the switching element S7 and the switching element S8 turn on and off alternately. The on and off phases of the switching elements S7 and S8 are delayed by 180° from the phases of the switching element S5 and S6. The time ratio in the voltage converter circuit 14 is defined as a ratio of the time during which the control signal Cn6 is turned on with respect to the cycle of the control signal Cn6. The control unit 22 makes the time ratio in the voltage converter circuit 14 similar to or identical with the time ratio in the power-factor improvement circuit 10.

The control unit 22 delays the phase for switching the second switching circuit 16 with respect to the phase for the first switching circuit 12, in accordance with a difference between the voltage across the terminals of the output capacitor Cout and its target value.

The operation of the voltage converter circuit 14 will be described on the assumption that the output capacitor Cout is charged with a fixed voltage Vd.

Figure 10:
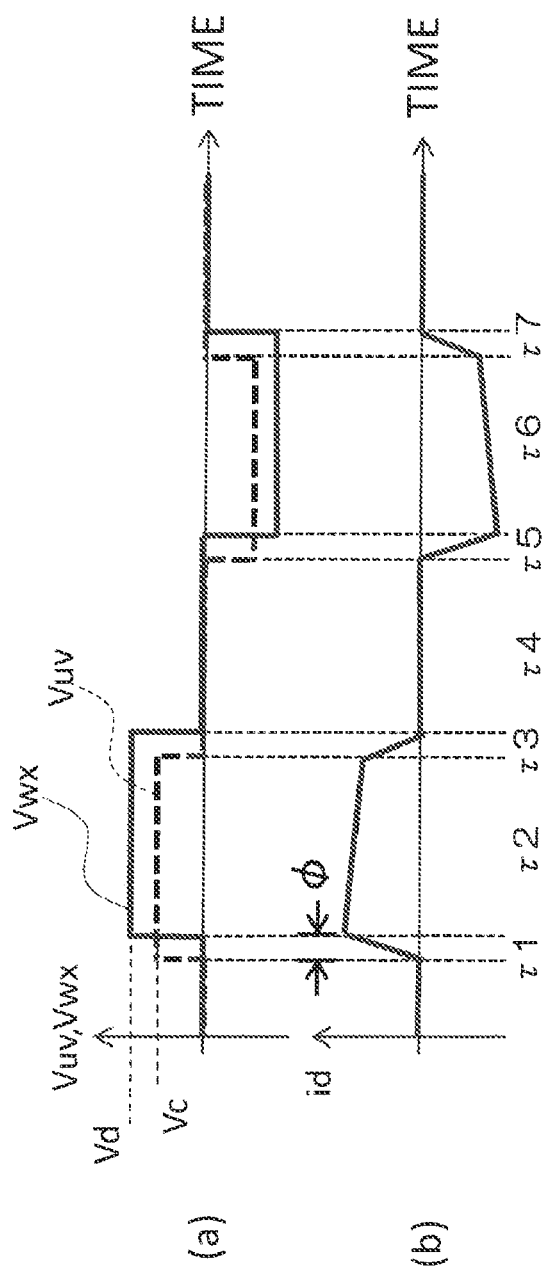
FIG. 10 is a diagram showing time waveforms of primary winding voltage, secondary winding voltage, and secondary winding current.

Referring to FIG. 10, a chart (a) indicates the time waveforms of primary winding Vuv and secondary winding voltage Vwx. The secondary winding voltage Vwx is voltage at the connecting point of the switching elements S5 and S6 with reference to the potential at the connecting point of the switching elements S7 and S8. The primary winding voltage Vuv is a rectangular wave having a peak value of Vc, and the secondary winding voltage Vwx is a rectangular wave having a peak value of Vd. The secondary winding voltage Vwx has a phase which is delayed by φ with respect to the primary winding voltage Vuv. A chart (b) indicates the time waveform of the current id flowing through the secondary winding T2. In the drawing, the direction of the secondary winding current id from the output half bridge X toward the output half bridge W is the positive direction.

During a time period τ1 in which the primary winding voltage Vuv rises from 0 to Vc and the secondary winding voltage Vwx is 0, the secondary winding current id rapidly increases in the positive direction from 0. Afterwards, the secondary winding voltage Vwx rises to Vd, and during a time period τ2 in which the primary winding voltage Vuv is Vc and the secondary winding voltage Vwx is Vd, the secondary winding current id changes mildly. Further, during a time period τ3 in which the primary winding voltage Vuv falls from Vc to 0 and the secondary winding voltage Vwx is Vd, the secondary winding current id steeply decreases toward zero.

During a time period τ4 in which the primary winding voltage Vuv and the secondary winding voltage Vwx are 0, the secondary winding current id is zero.

During a time period τ5 in which the primary winding voltage Vuv falls from 0 to −Vc and the secondary winding voltage Vwx remains zero, the secondary winding current id steeply increases toward the negative direction from zero. Thereafter, during a time period τ6 in which the secondary winding voltage Vwx falls to and remains −Vd and the primary winding voltage Vuv is −Vc, the secondary winding current id changes mildly. During a time period τ7 in which the primary winding voltage Vuv rises from −Vc to zero and the secondary winding voltage Vwx is −Vd, the secondary winding current id steeply decreases toward zero.

During the time periods τ1 and τ5 from when the primary winding voltage Vuv rises and before the secondary winding voltage Vwx rises, energy is supplied from the primary winding T1 to the secondary winding T2 and simultaneously the secondary winding T2 stores the energy. During the time periods τ2, τ3, τ6, and τ7, the voltage converter circuit 14 outputs the electric power defined by a product of the secondary winding voltage Vwx and the secondary winding current id to the load circuit 20.

The greater the phase difference φ between the primary winding voltage Vuv and the secondary winding voltage Vwx, the longer the time periods τ1 and τ5 in which the energy accumulates in the secondary winding T2, and the greater the absolute value of the secondary winding current id during the time periods τ2, τ3, τ6, and τ7. The phase difference φ is a value less than 180°. Therefore, as the phase difference φ between the primary winding voltage Vuv and the secondary winding voltage Vwx increases, the electric power transmitted from the power-factor improvement circuit 10 to the voltage converter circuit 14 and then output from the voltage converter circuit 14 to the load circuit 20 also increases.

The control unit 22 controls switching of the switching elements S5 to S8 as described above to cause the secondary winding current id to flow from the upper end to the lower end of the output capacitor Cout, which is thus charged with predetermined voltage Vd.

The voltage converter circuit 14 is magnetically coupled to the power-factor improvement circuit 10 by the transformer T which is composed of the primary winding T1 and the secondary winding T2. The power-factor improvement circuit 10 is thus electrically insulated from the voltage converter circuit 14, which prevents the current induced by high voltage generated in the voltage converter circuit 14 from flowing into the power-factor improvement circuit 10. The primary winding voltage Vuv to be applied to the primary winding T1 has a time waveform which is symmetrical with respect to the positive and negative direction, as described above. This reduces the loss in the transformer T which occurs when the electric power is transmitted from the power-factor improvement circuit 10 to the voltage converter circuit 14.

Figure 11:
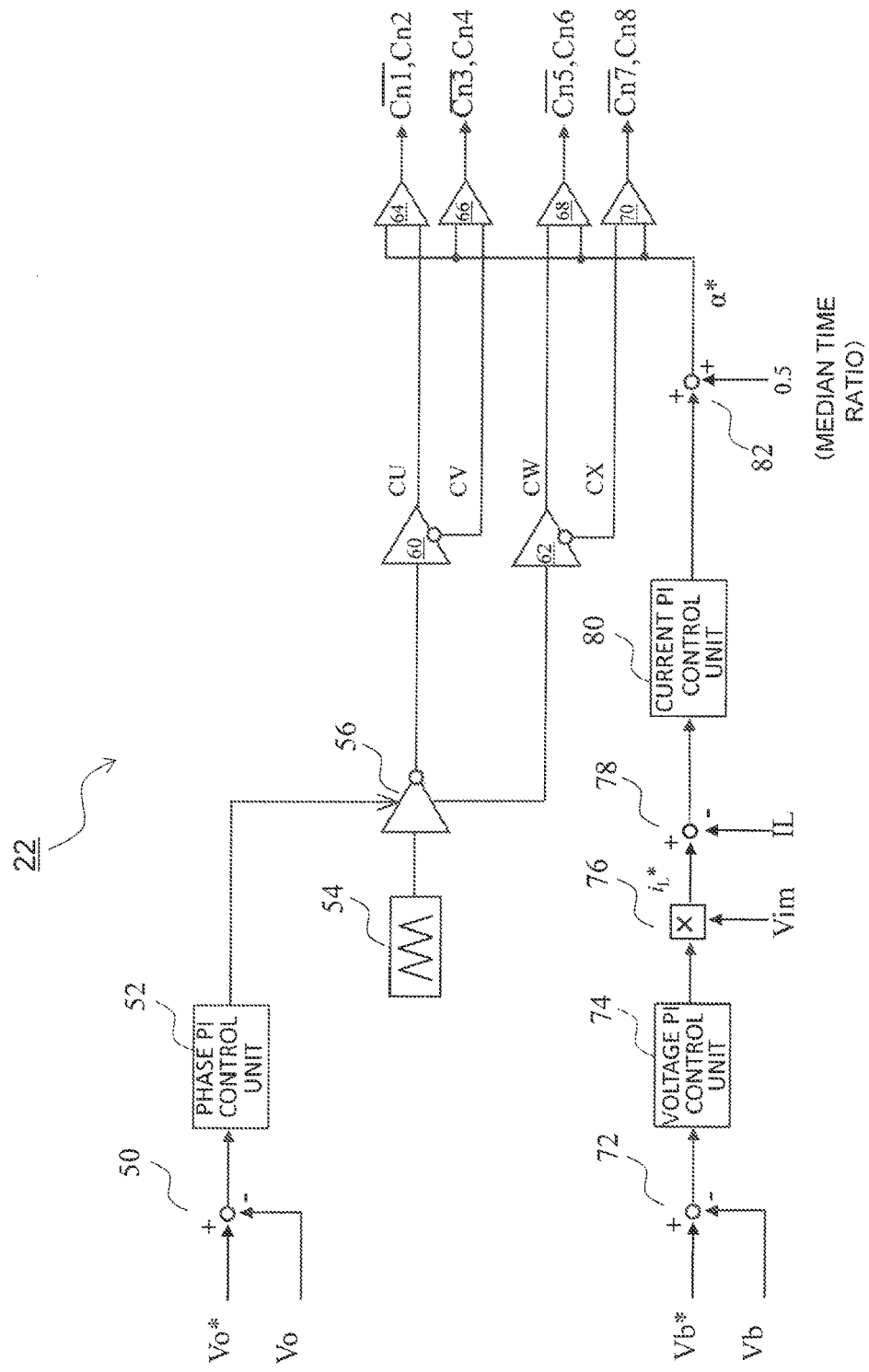
FIG. 11 is a diagram of an example structure of a control unit.

FIG. 11 illustrates an example structure of the control unit 22. The control unit 22 may include a processor which implements the elements illustrated in FIG. 11 by executing a program. Alternatively, each element may be configured individually by an electric circuit as hardware.

The control unit 22 generates the control signals using a measured value Vb of the voltage across the terminals of the buffer capacitor Cbuf, a measured value Vim of the alternating-current voltage Vin, a measured value IL of the current iL flowing through the reactor L, and a measured value Vo of the voltage output from the voltage converter circuit 14 to the load circuit 20. The power converter includes sensors (not shown) that measure these values.

The control unit 22 determines the time ratio α based on a difference between the buffer voltage measured value Vb which is a measured value of the voltage across the terminals of the buffer capacitor Cbuf and a buffer voltage target value Vb* which is a target value of the buffer voltage measured value Vb. The control unit 22 also delays the phase for switching the second switching circuit 16 with respect to the first switching circuit 12 based on a difference between the output voltage measured value Vo which is a measured value of the output voltage from the voltage converter circuit 14 to the load circuit 20 and an output voltage target value Vo* which is a target value of the output voltage measured value Vo.

A subtracter 72 subtracts the buffer voltage measured value Vb from the buffer voltage target value Vb* to determine a first error and outputs the first error to a voltage PI control unit 74. The voltage PI control unit 74 determines a first control value based on proportional-plus-integral control and outputs the first control value to a multiplier 76.

The multiplier 76 multiplies the first control value by a measured value Vim of the input alternating-current voltage Vin to determine a reactor current target value iL* and outputs the reactor current target value iL* to a subtracter 78. The subtracter 78 subtracts a reactor current measured value IL from the reactor current target value iL* to determine a second error and outputs the second error to a PI control unit 80. The current PI control unit 80 determines a second control value based on proportional-plus-integral control and outputs the second control value to an adder 82. The adder 82 adds 0.5 to the second control value to determine a time ratio target value α*. The value 0.5 which is added to the second control value is the median of possible values of the time ratio α. The adder 82 outputs the time ratio target value α* to comparison units 64, 66, 68, and 70.

A subtracter 50 subtracts the output voltage measured value Vo from the output voltage target value Vo* to determine a third error, and outputs the third error to a phase PI control unit 52. The phase PI control unit 52 determines a third control value based on proportional-plus-integral control, and outputs the third control value to a phase adjustment unit 56. A carrier generation unit 54 outputs a carrier signal for pulse width modulation to the phase adjustment unit 56. The carrier signal has a time waveform, which is a triangular wave, for example.

The phase adjustment unit 56 further changes the phase of the carrier signal output from the carrier generation unit 54 based on the third control value, and outputs the resulting signal to a primary buffer amplifier 60. The phase adjustment 56 advances the phase of the carrier signal by a greater amount as the third control value is greater. The primary buffer amplifier 60 outputs the carrier signal supplied from the phase adjustment unit 56 to the comparison unit 64 as a U-phase carrier signal CU. The primary buffer amplifier 60 further delays the carrier signal supplied from the phase adjustment unit 56 by 180° and outputs the delayed carrier signal to the comparison unit 66 as a V-phase carrier signal CV. Depending on the time waveform of the carrier signal, a signal with an inverted high or low state may be used as the signal having a phase which is delayed by 180°.

The phase adjustment unit 56 further outputs the carrier signal to a secondary buffer amplifier 62. The secondary buffer amplifier 62 outputs the carrier signal supplied from the phase adjustment unit 56 to the comparison unit 68 as a W-phase carrier signal CW. The secondary buffer amplifier 62 further delays the carrier signal supplied from the phase adjustment unit 56 by 180° and outputs the delayed carrier signal to the comparison unit 70 as an X-phase carrier signal CX. Depending on the time waveform of the carrier signal, a signal with an inverted high or low state may be used as the signal having a phase which is delayed by 180°.

While in the above example, the phase adjustment unit 56 advances the phase of the signal to be output to the primary buffer amplifier 60 based on the third control value, the phase adjustment unit 56 may delay the phase of the signal to be output to the secondary buffer amplifier 62 based on the third control value.

The comparison unit 64 sets a control signal Cn1⁻ and a control signal Cn2 to low when the U-phase carrier signal CU exceeds the time ratio target value α*. When the U-phase carrier signal CU is equal to or less than the time ratio target value α*, the comparison unit 64 sets the control signal Cn1⁻ and the control signal Cn2 to high.

The comparison unit 66 sets the control signal Cn3⁻ and the control signal Cn4 to low when the V-phase carrier signal CV exceeds the time ratio target value α*. The comparison unit 66 further sets the control signal Cn3⁻ and the control signal Cn4 to high when the V-phase carrier signal CV is equal to or less than the time ratio target value α*.

The comparison unit 68 sets the control signal Cn5⁻ and the control signal Cn6 to low when the W-phase carrier signal CW exceeds the time ratio target value α*. The comparison unit 68 further sets the control signal Cn5⁻ and the control signal Cn6 to high when the W-phase carrier signal CW is equal to or less than the time ratio target value α*.

The comparison unit 70 sets the control signal Cn7⁻ and the control signal Cn8 to low when the X-phase carrier signal CX exceeds the time ratio target value α*. The comparison unit 70 further sets the control signal Cn7⁻ and the control signal Cn8 to high when the X-phase carrier signal CX is equal to or less than the time ratio target value α*.

This control increases the time ratio target value α* when the buffer voltage measured value Vb is below the buffer voltage target value Vb*, and decreases the time ratio target value α* when the buffer voltage measured value Vb exceeds the buffer voltage target value Vb*. This makes the voltage across the buffer capacitor Cbuf close to or identical with the voltage target value Vb*.

When the output voltage measured value Vo is below the output voltage target value Vo*, the delay of the phase for switching the second switching circuit 16 is increased with respect to the phase for switching the first switching circuit 12. When the output voltage measure value Vo exceeds the output voltage target value Vo*, the advance of the phase for switching the second switching circuit 16 is increased with respect to the phase for switching the first switching circuit 12. This control makes the output voltage close to or identical with the output voltage target value Vo*.

Figure 12:
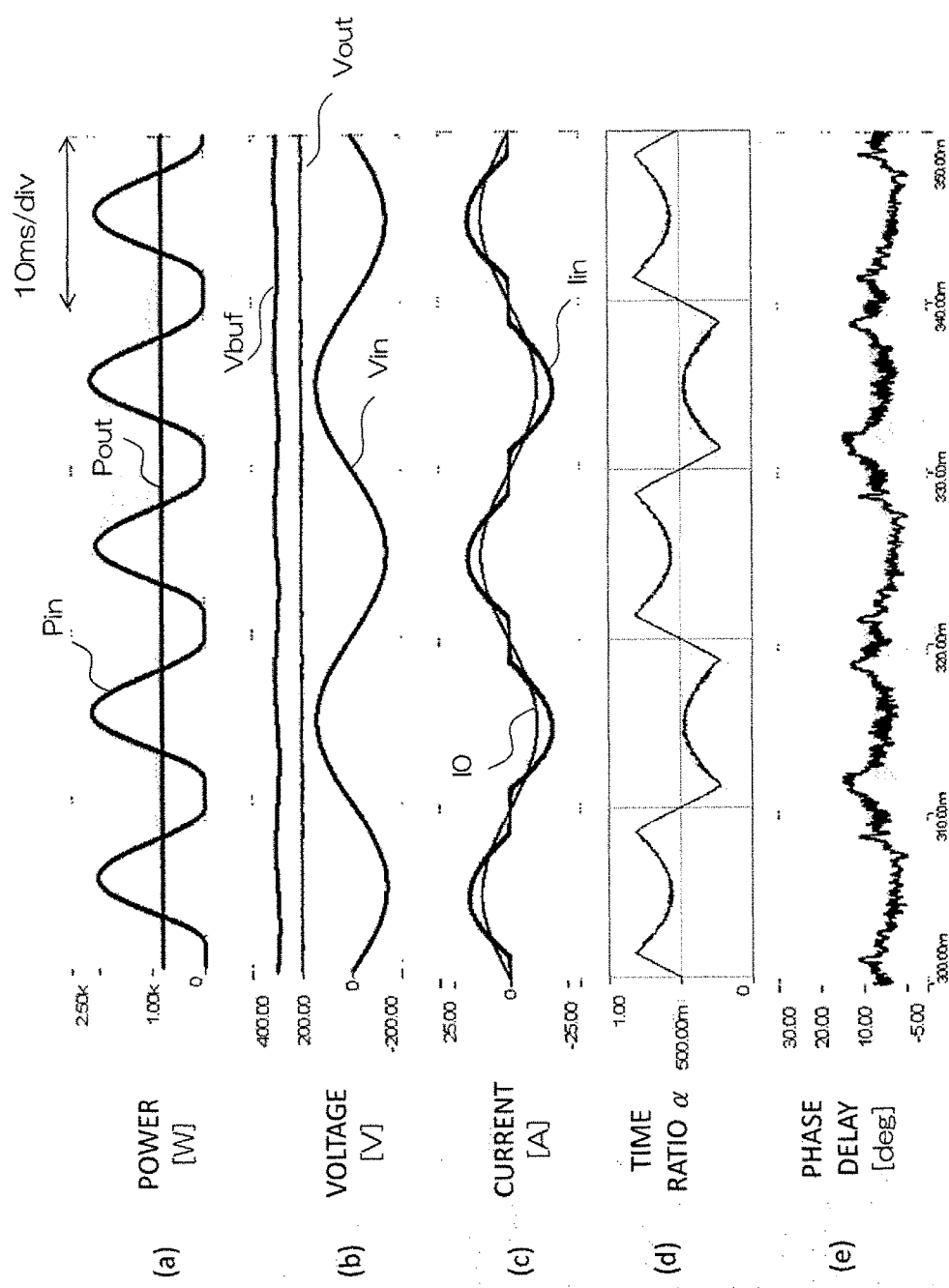
FIG. 12 is a graph showing simulation results concerning the power converter.

FIG. 12 shows simulation results concerning the power converter according to the embodiment of the present disclosure. In FIG. 12, the horizontal axis indicates time. The chart (a) shows electric power Pin input to the power converter and electric power Pout output from the power converter to the load circuit 20.

The chart (b) in FIG. 12 shows the voltage Vbuf (buffer voltage) across the terminals of the buffer capacitor Cbuf and the voltage Vout output from the power converter to the load circuit 20.

The chart (c) in FIG. 12 shows input current Iin at the power source input terminal 19-1 and target input current I0.

The chart (d) in FIG. 12 shows the time waveform of the time ratio α. As indicated in FIG. 11, because the time ratio target value α* is determined based on a value obtained by multiplying the first control value by the input alternating-current voltage measured value Vim, the time ratio target value α* reflects the input alternating current Vin. Therefore, the time ratio α in operating the first switching circuit 12 and the second switching circuit 16 is determined in accordance with the value of the input alternating current Vin.

The chart (e) in FIG. 12 indicates the delay in the switching phase for the second switching circuit 16 with respect to the switching phase for the first switching circuit 12. When predetermined electric power is supplied to the load circuit 20, the delay in the phase is smaller as the time ratio α is closer to 0.5. This is because extension of the time periods τ2 and τ6 in FIG. 10 eliminates the need to increase the current flowing in the secondary winding T2 in the time periods τ1 and τ5.

Figure 13:
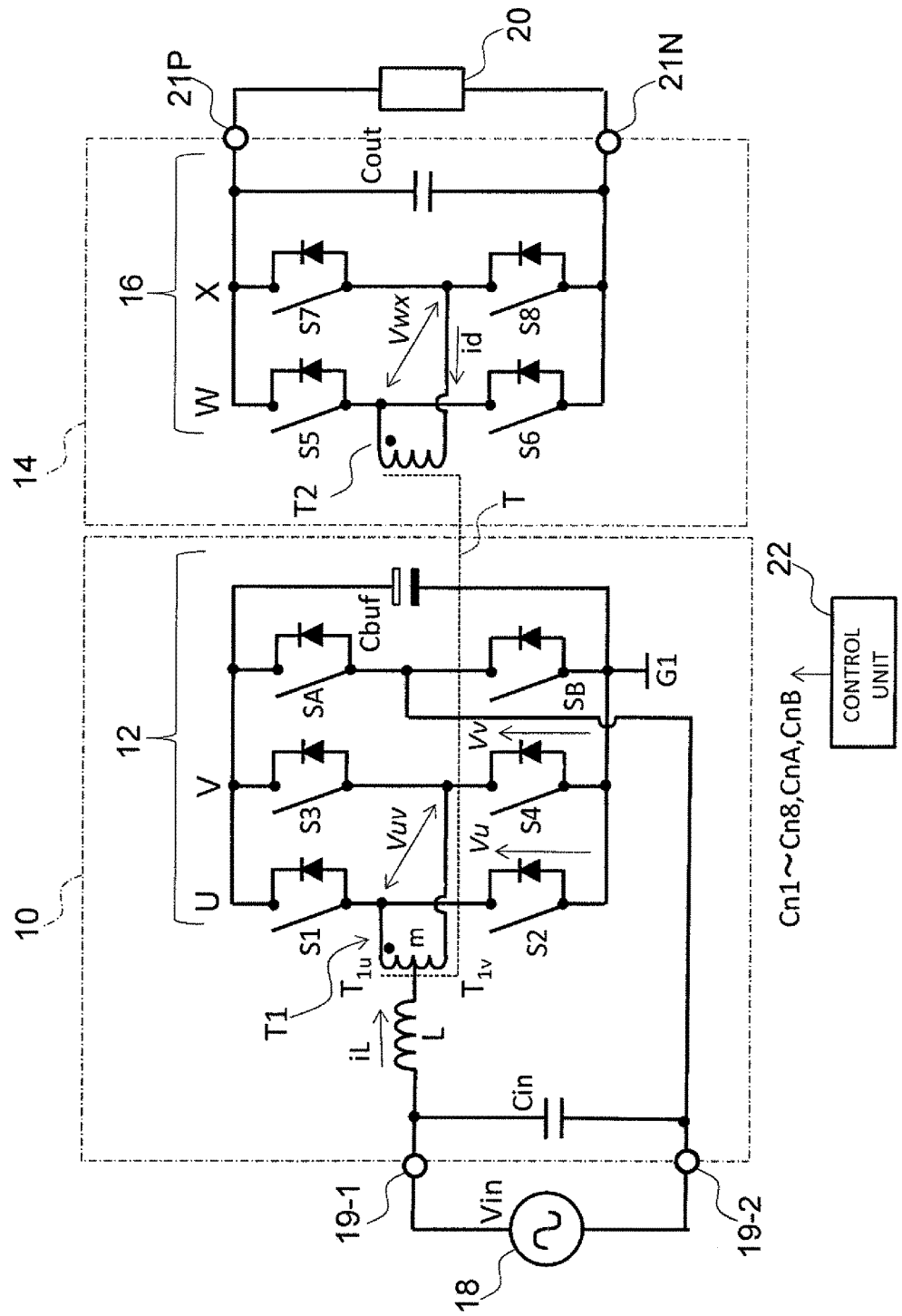
FIG. 13 is a diagram of a modification example structure of the power converter.

FIG. 13 illustrates a power converter according to a modification example. In this power converter, the diodes D1 and D2 in the power converter illustrated in FIG. 1 are replaced by switching elements SA and SB, respectively, which are used as two rectifier elements. The switching elements SA and SB may be IGBTs, for example. In this case, an emitter of the IGBT serving as the switching element SA and a collector of the IGBT serving as the switching element SB are connected to each other.

The control unit 22 controls the switching element SA on and off using a control signal CnA, and controls the switching element SB on and off using a control signal CnB.

During a half cycle in which the input alternating-current voltage Vin has positive values, by controlling the switching element SA to turn off and controlling the switching element SB to turn on, currents similar to those shown in FIGS. 3 to 5 flow in the power-factor improvement circuit 10. During a half cycle in which the input alternating-current voltage Vin has negative values, by controlling the switching element SA to turn on and controlling the switching element SB to turn off, currents similar to those shown in FIGS. 7 to 9 flow in the power-factor improvement circuit 10.

Figure 14:
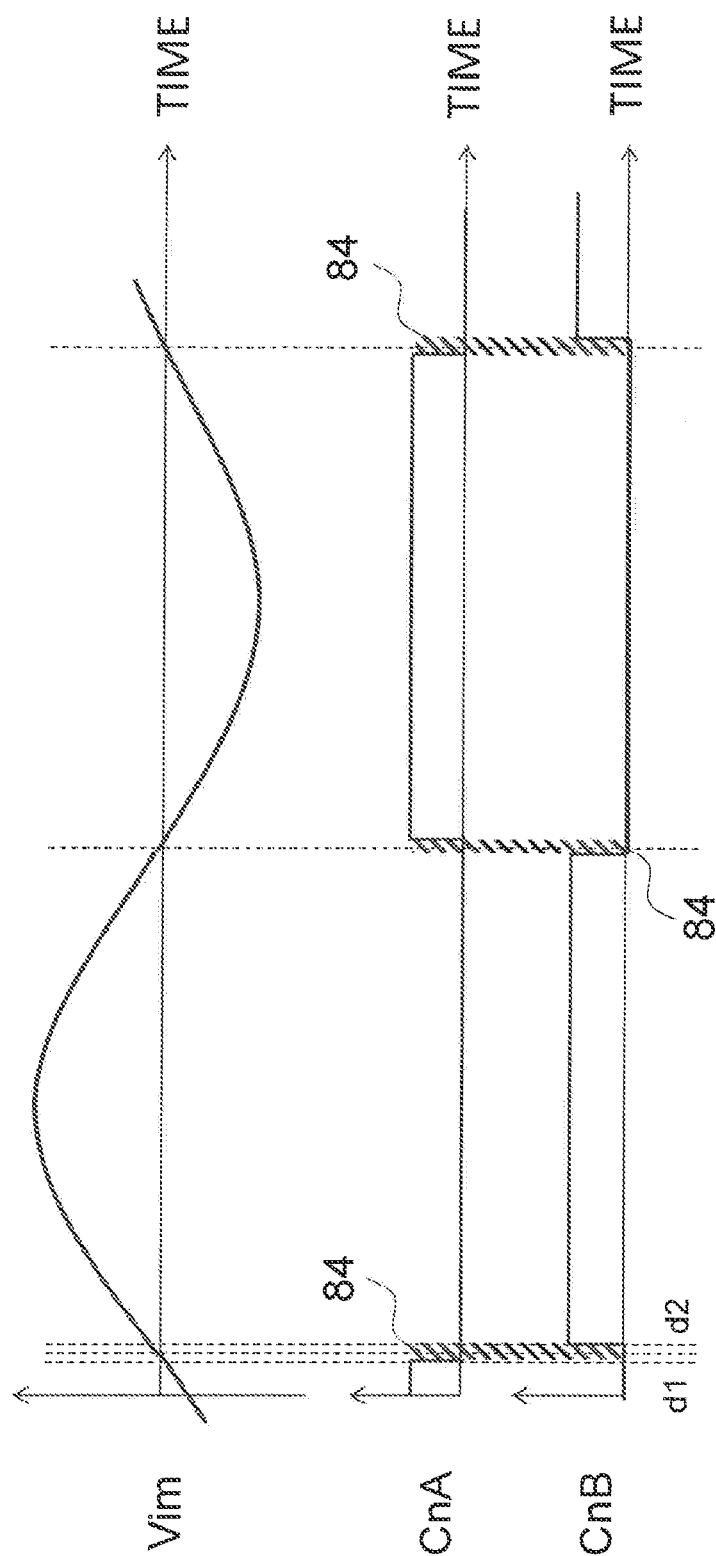
FIG. 14 is a diagram showing ON-OFF control timing of switching elements SA and SB.

FIG. 14 shows the timing for controlling the switching elements SA and SB on and off. FIG. 14 indicates the time waveform of an input alternating-current voltage measured value Vim. The control unit 22 sets the control signal CnA low and sets the control signal CnB high when the input alternating-current voltage measured value Vim is positive during a time other than the dead time which will be described below. This control turns the switching element SA off and turns the switching element SB on. The control unit 22 further sets the control signal CnA high and sets the control signal CnB low when the input alternating-current voltage measured value Vim is negative during a time other than the dead time which will be described below. This control turns the switching element SA on and turns the switching element SB off.

A dead time 84 is set from a time prior to change of the polarity of the input alternating-current voltage measured value Vim by d1 to a time after the polarity change by d2. During the dead time 84, the control unit 22 controls both the control signals CnA and CnB low, which turns both of the switching elements SA and SB off during the dead time 84.

Use of a switching element in place of a diode as a rectifier element reduces loss in the diode caused by forward resistance. Also, setting the dead time for controlling the switching elements SA and SB prevents the switching elements SA and SB from being simultaneously turned on due to control error, thereby avoiding short circuit across the buffer capacitor Cbuf.

The invention claimed is:

1. A power converter, comprising:
   a first switching circuit;
   a second switching circuit;
   a primary winding having both ends connected to the first switching circuit;
   a secondary winding having both ends connected to the second switching circuit, the secondary winding being magnetically coupled to the primary winding; and
   a reactor having a first end connected to an intermediate connecting point of the primary winding, wherein
   the first switching circuit comprises:
      a full bridge having a first half bridge and a second half bridge connected in parallel, the first half bridge and second half bridge each comprising two switching elements, one end of one switching element and one end of the other switching element being connected to a common point, and
      a first rectifying element and a second rectifying element, one end of the first rectifying element and one end of the second rectifying element being connected to a common point,
   the primary winding is connected between a connecting point of the two switching elements of the first half bridge and a connecting point of the two switching elements of the second half bridge,
   the first rectifying element includes the other end connected to one of two parallel connecting points of the full bridge,
   the second rectifying element includes the other end connected to the other one of the two parallel connecting points, and
   alternating-current voltage is input between a second terminal of the reactor and a connecting point of the first rectifying element and the second rectifying element.

2. The power converter according to claim 1, wherein
   the second switching circuit comprises an output full bridge having a first output half bridge and a second output half bridge connected in parallel, the first output half bridge and second output half bridge each comprising two switching elements, one end of one switching element and one end of the other switching element being connected to a common point,
   the secondary winding is connected between a connecting point of the two switching elements of the first output half bridge and a connecting point of the two switching elements of the second output half bridge, and
   electric power is output from two parallel connecting points of the output full bridge.

3. The power converter according to claim 2, further comprising:
   a capacitor connected to the two parallel connecting points of the full bridge; and
   a controller configured to switch the full bridge and the output full bridge at a time ratio in accordance with a difference between voltage across terminals of the capacitor and a target value of the voltage across the terminals of the capacitor.

4. The power converter according to claim 2, further comprising:
   an output capacitor connected to the two parallel connecting points of the output full bridge; and
   a controller configured to switch the full bridge and the output full bridge, wherein
   the controller is configured to control a difference between a phase for switching the full bridge and a phase for switching the output full bridge in accordance with a difference between voltage across terminals of the output capacitor and a target value of the voltage across the terminals of the output capacitor.

5. The power converter according to claim 4, further comprising:
   a capacitor connected to the two parallel connecting point in the full bridge; and
   a controller configured to switch the full bridge and the output full bridge at a time ratio in accordance with a difference between voltage across terminals of the capacitor and a target value of the voltage across the terminals of the capacitor.

6. The power converter according to claim 1, wherein
   each of the first rectifying element and the second rectifying element is a switching element configured to be turned on an off in accordance with a value of the alternating-current voltage.

* * * * *

UNITED STATES PATENT AND TRADEMARK OFFICE
CERTIFICATE OF CORRECTION

Page 1 of 1

PATENT NO. : 10,097,106 B1
APPLICATION NO. : 15/876600
DATED : October 9, 2018
INVENTOR(S) : Kenichi Takagi et al.

It is certified that error appears in the above-identified patent and that said Letters Patent is hereby corrected as shown below:

In the Claims

Column 15, in Claim 1, Line 62 please change "second haft" to --second half--

Signed and Sealed this
Sixteenth Day of April, 2019

Andrei Iancu
*Director of the United States Patent and Trademark Office*